United States Patent Office 2,768,052
Patented Oct. 23, 1956

2,768,052

ANTHRAQUINONE DYE-CELLULOSE ACETATE COMPOSITION AND PROCESS OF MAKING SAME

Robert C. Johnson, Wilmington, Del., assignor to E. I. du Pont de Nemours and Company, Wilmington, Del., a corporation of Delaware No Drawing. Application August 26, 1953,
Serial No. 376,751

4 Claims. (Cl. 8—40)

This invention relates to a dye-fiber composition and to a process of producing said composition and more particularly to a dye-fiber composition of organic acid esters of cellulose and an anthraquinone compound not heretofore recognized as a dye for any fiber.

One of the difficulties in the dyeing of organic esters of cellulose and more particularly cellulose acetate has been the problem of producing a pink dye which would have good affinity and possess outstanding properties with respect to build-up, sublimation and light fastness. The compound, 1-amino-2-methoxy-4-hydroxy anthraquinone, sold commercially as a pink dye, has been found to have definite shortcomings with respect to build-up, sublimation and light fastness when used in dyeing cellulose acetate fiber.

This invention has as an object the preparation of a dye-fiber composition comprising an acid ester of cellulose dyed with an anthraquinone dye compound, wherein said dye possesses superior properties with respect to build-up, sublimation and light fastness over the best pink dye known for these fibers now on the market.

A further object is the production of a dye-fiber composition comprising cellulose acetate fiber dyed with a pink dye of the anthraquinone series.

Other objects of the invention will appear hereinafter.

The objects of the present invention are accomplished by the use of 1-amino-2-alkoxyethoxy-4-hydroxyanthraquinone, wherein the alkoxy group contains one or two carbon atoms, as a dye on cellulose acetate fiber. This compound corresponds to the formula:

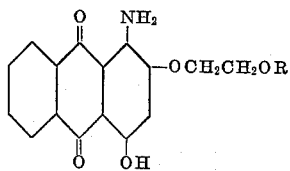

wherein R is an alkyl group of from one to two carbon atoms. These compounds possess superior properties with respect to build-up, sublimation and light fastness when used as a dye for cellulose acetate fiber.

The following example will better illustrate the nature of the present invention, but the invention is not intended to be restricted to this example. The parts used are by weight.

Example I 0.05 part of finely divided 1-amino-4-hydroxy-2-methoxy-ethoxyanthraquinone are pasted thoroughly with 1 part of oleate soap solution and dispersed in 50 parts of water at 190° F. The volume is made up to 200 parts with cold water and 5 parts of cellulose acetate (piece goods or skein) are added. The dyebath is heated to 180–190° F. and for 15 minutes, the cellulose acetate is turned continuously. Dyeing is continued for a total of 45 minutes at 180–190° F. The dyed material is removed from the dyebath, rinsed in cold water and dried.

The so-called 1% dyeing obtained possesses excellent brightness, light-fastness and resistance to sublimation.

When the 2-ethoxy-ethoxy analog is used in place of the 2-methoxy-ethoxy compound similar results are obtained.

The compound 1-amino-2-methoxy(and ethoxy)-ethoxy-4-hydroxyanthraquinone used as the dye in Example I may be prepared by converting 1-amino-2-bromo-4-hydroxyanthraquinone to 1-amino-2-phenoxy-4-hydroxyanthraquinone by treatment with phenol and caustic. The 2-phenoxy compound is then reacted with caustic and an excess of the appropriate ethylene glycol mono-alkyl ether to form 1-amino-2-methoxy-(and ethoxy)-4-hydroxyanthraquinone. A one-step procedure may be employed which will eliminate the isolation of the intermediate 1-amino-2-phenoxy-4-hydroxyanthraquinone. By this procedure, phenol, caustic and ethylene glycol mono-alkyl ether are reacted in one operation with 1-amino-2-bromo-4-hydroxyanthraquinone to form 1-amino-2-methoxy-(and ethoxy)-4-hydroxyanthraquinone. The products obtained by the above outlined procedures are comparable in quality and dyeing properties.

Example I describes a 1% dyeing. However, dyeings as high as 6 to 8% by weight may be obtained by using the same procedure. The compounds 1-amino-2-methoxy-(and ethoxy)-ethoxy-4-hydroxyanthraquinone build up to full shades at 6 to 8%.

Various modifications and variations in preparing the crude dye in finely divided form, dispersion techniques and dye bath additives will be obvious to those skilled in the art. Milling of the dye for purposes of application, as in Example I, is not a requirement but it facilitates standardization and use.

While the invention has been illustrated by and the example directed to the preparation of a cellulose acetate dye composition, the compounds of the present invention can be be used as a light-fast dispersed dye for "Dacron" polyester fiber.

It is to be understood that the form of my invention herewith described is to be taken as a preferred example of the same and that various changes may be made without departing from the spirit of my invention and the scope of the appended claims.

I claim:

1. A cellulose fiber-dye composition comprising cellulose acetate dyed with 1-amino-2-alkoxy-ethoxy-4-hydroxyanthraquinone, wherein the alkoxy group contains from 1 to 2 carbon atoms.

2. A cellulose fiber-dye composition comprising cellulose acetate dyed with 1-amino-2-methoxy-ethoxy-4-hydroxyanthraquinone.

3. A cellulose fiber-dye composition comprising cellulose acetate dyed with 1-amino-2-ethoxy-ethoxy-4-hydroxyanthraquinone.

4. Process of dyeing cellulose acetate which comprises the application thereto of 1-amino-2-alkoxy-ethoxy-4-hydroxyanthraquinone wherein the alkoxy group contains from 1 to 2 carbon atoms from an aqueous dispersion of the dyestuff.

References Cited in the file of this patent

UNITED STATES PATENTS 1,964,971    Albrecht _____ July 3, 1934

FOREIGN PATENTS 927,445    France _____ May 5, 1947